Feb. 21, 1956 W. W. VENABLE 2,735,618
PHOTOGRAPHIC EXPOSURE CALCULATOR
Filed Feb. 28, 1952 2 Sheets-Sheet 1
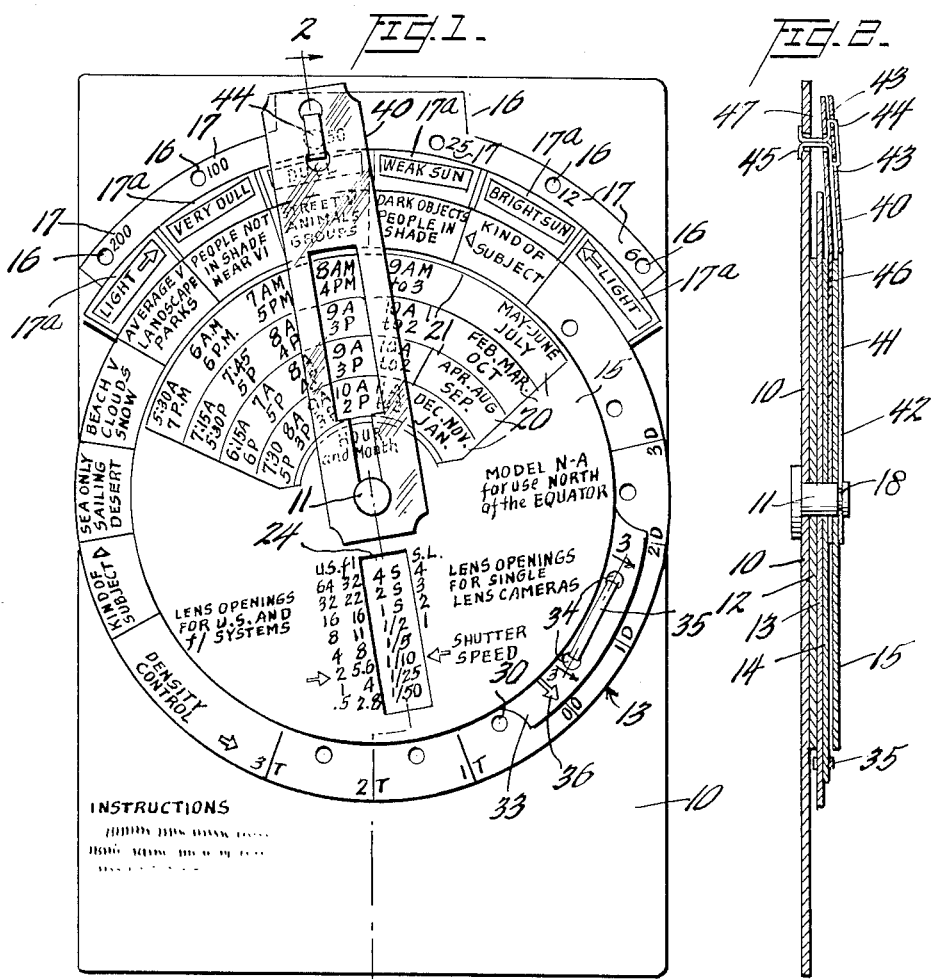
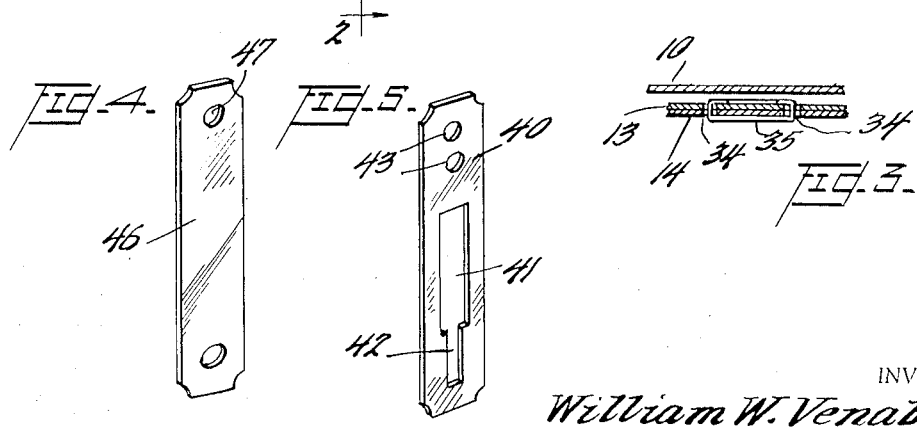
INVENTOR
*William W. Venable,*
BY *Parker and Walsh.*
ATTORNEYS

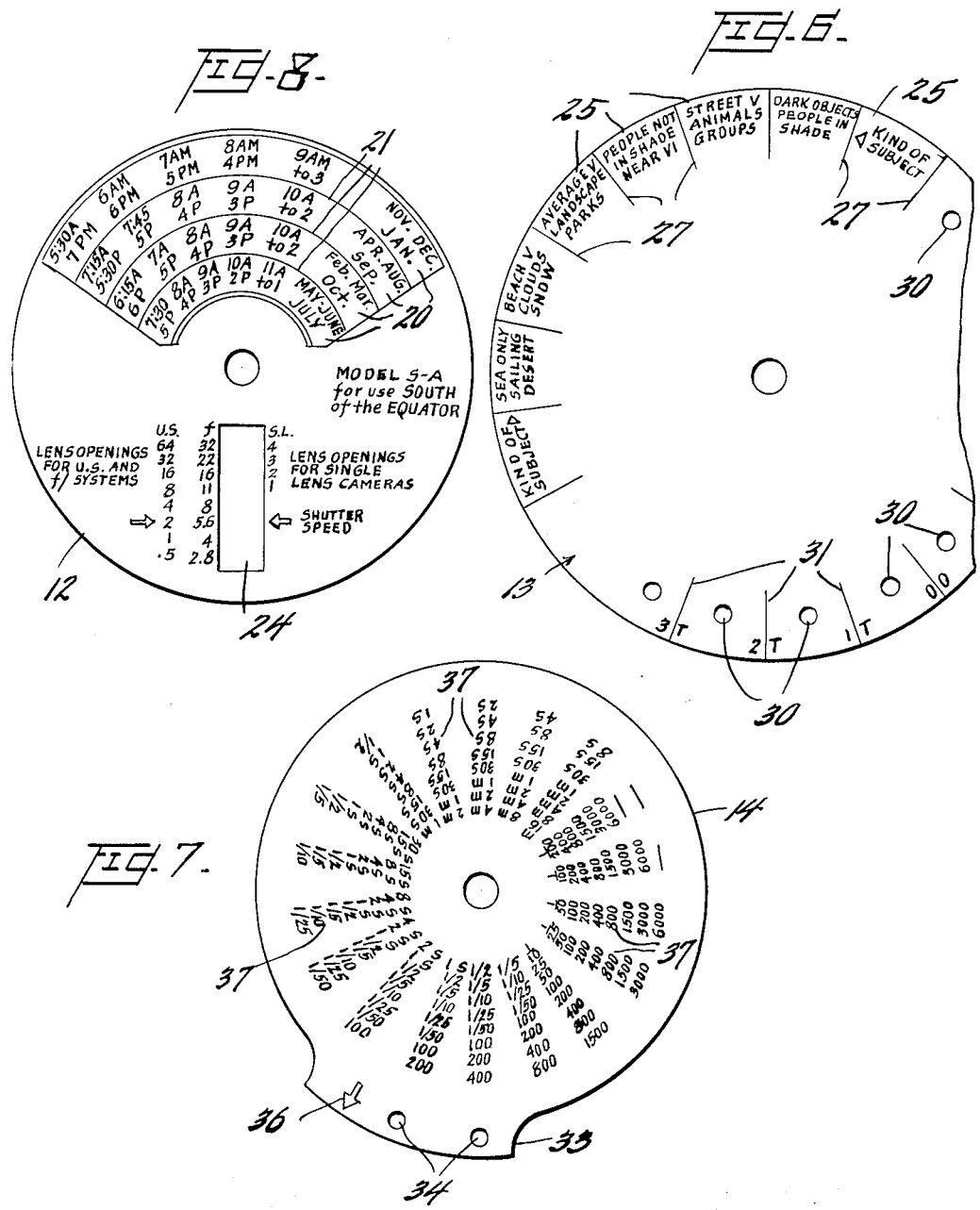

United States Patent Office 2,735,618
Patented Feb. 21, 1956

2,735,618

PHOTOGRAPHIC EXPOSURE CALCULATOR

William W. Venable, Charleston, W. Va.

Application February 28, 1952, Serial No. 274,000

5 Claims. (Cl. 235—64.7)

This invention relates to a photographic exposure calculator for determining the proper duration of photographic exposure from certain known conditions and more particularly to a device of the character which relies on well known empirical formulae for combining the various factors that govern the length of exposure such as, type of subject, type of film, conditions of the sky, hour of the day, month of the year, camera lens opening, and shutter speed.

In photography, particularly as practiced by amateurs, it is quite desirable, and most people prefer, to have a negative of medium and uniform density in order to be able to use a single grade of contact or enlargement paper. Uniform density can usually be obtained by careful use of any good exposure calculator. However, the desired degree of density is more difficult to obtain with the result that many photographers who use some type of exposure calculator find their negatives too dense or too thin to suit them.

The trouble in many, if not most, cases of this type, is due to a defective camera shutter, and this is usually chronic. In other cases the difficulty may be due to commercial processing in which all films are likely to get the same treatment as regards formula for developer, temperature of solution and time of development, with the result, that the negatives may be uniformly and persistently too dense or too thin to suit the photographer. Other contributing factors are the use of light filters, which makes for a longer exposure than that indicated as necessary, and working in high altitudes where the atmosphere is extremely clear and the sky is extremely blue, which results in denser negatives.

It is, of course, possible to make corrections to allow for the above difficulties by manipulation of some one or more of the camera indexes each time an exposure is made. For example, one may use a shutter speed or lens opening, different from that indicated by the exposure calculator, after a mental calculation in each case. Another way is to use a film rating higher or lower than that listed for the film he is using. These, however, are tasks which are easily forgotten and which, furthermore, consume time and breed confusion, at a time when all of an operator's attention is needed in the more urgent details of the exposure.

A principal object of the present invention is the provision of an improved photographic exposure calculator by the use of which the degree, as well as the uniformity, of density of the negative may be controlled to obtain any desired degree of density.

A further object of the invention is to improve and simplify the construction and operation of photographic exposure calcualtors whereby more satisfactory exposures can be made under all conditions of use.

A still further object of the invention is the provision of a photographic exposure calculator wherein the movable parts may be operated with lessened interference with each other thereby facilitating the speed and accurate setting of the meter to any desired conditions.

Another object of the invention is the provision of a photographic exposure calculator which may be quickly and easily assembled or disassembled for replacement or rearrangement of parts to adopt the meter for use in widely different localities, for example, south, as well as north, of the equator.

These and other objects and advantages of the invention will become more apparent from the following description, taken with the accompanying drawings, illustrating a preferred form of the invention.

In the drawings:

Figure 1 is a plan view of the front face of an exposure calculator constructed in accordance with the invention;

Figure 2 is a cross-sectional view of the meter taken on the line 2—2 of Figure 1;

Figure 3 is a detail cross-sectional view taken on the line 3—3 of Figure 1;

Figure 4 is a perspective view of the disc separating arm;

Figure 5 is a perspective view of the film arm;

Figure 6 is a plan view of the large disc;

Figure 7 is a plan view of an intermediate disc; and

Figure 8 is a plan view of an alternate form of top disc suitable for use south of the equator.

Referring now to Figures 1 and 2 of the drawings, the numeral 10 designates a base, preferably rectangular in shape and carrying a headed stud 11, on which are rotatably mounted a plurality of indicia bearing discs or plates 12, 13, 14 and 15. The base and discs may be made of any suitable, relatively thin sheet material such as cardboard, plastic, metal or the like.

Adjacent the top thereof, the base 10 is provided with a series of preferably arcuately arranged openings 16, having indicating numerals 17 adjacent thereto corresponding to various film ratings, as for example, Weston Film Ratings. As is well understood, such ratings are arbitrary designations, which afford a comparative measure of the relative speeds of various types of films. For example, a film having a Weston rating of 100 has twice the speed or is twice as fast as a film having a Weston rating of 50. Such ratings, therefore, provide a convenient way of classifying films according to their relative speeds.

The base 10 is provided with a further series of preferably arcuately arranged sectors 17a inwardly of but adjacent to the openings 16, such sectors being delineated by a plurality of concentric and radial lines, and bearing suitable light designating indicia such as, very dull, dull, weak sun and bright sun. Adjacent its bottom portion and below the discs, the base 10 may have printed, typed, or otherwise applied thereto suitable instructions for the use of the device which instructions may, if desired, together with any additional explanatory matter, be continued on the back of the base.

The headed stud 11 projects upwardly from the front face of the base 10 and is provided adjacent its upper end with an annular groove 18 for a purpose to be described. Such stud may desirably have a snug fit with the walls of the opening in the base 10 in which it is received so that it will be releasably retained therein during assembly and disassembly of the device.

Referring now to the discs, it should be pointed out that the discs 12 and 15 are substantially identical in construction and marking, except that one is designed for use north of the equator while the other is designed for use south of the equator. For this purpose the arrangement of the months, as well as the notation of use, is different. It will be appreciated, of course, that the discs 12 and 15 are designed for alternate use and that the one in use at any particular time is disposed similarly to the disc 15, namely, as the top disc of the group, while the disc not in use is disposed similarly to the disc 12 in Figure 2, namely between the lower disc 13 and the base 10. By virtue of this arrangement either disc is always readily available for use and can be quickly and easily interchanged with the other disc in a manner hereinafter described.

The discs 12 and 15 are smaller in size than the disc 13 and approximately the same size as the disc 14. Each of the discs 12 and 15 is provided with a series of arcuate sectors 20, delineated by concentric circles 21, and marked with the months of the year as shown in Figures 1 and 8. The sectors 20 are also marked with the hours of the day, such markings being disposed along circumferentially spaced, substantially radial lines to form a series of radially disposed tables.

On the side thereof, opposite the indicia just described, each of the discs 12 and 15 is provided with an elongated substantially rectangular opening or window 24 which serves to expose certain indicia on the disc 14. It will be appreciated, of course, that the opening 24 may be replaced by a transparent window or a transparent portion forming an integral part of the disc. Along the longitudinal edges of the opening 24 are arranged a plurality of columns of figures indicating the lens openings for various systems and cameras. Suitable identifying indicia for the numbers is also desirably included to facilitate and clarify the use thereof.

The disc 13 is somewhat larger than the other discs and is preferably of a size such that portions of the periphery thereof project slightly beyond the edges of the base portion 10 to facilitate turning. Along one side thereof, adjacent the edges, the disc 13 is provided with a plurality of circumferential sectors 25, delineated by radial lines 27, each of the sectors 25 bearing suitable subject identifying indicia as shown in Figures 1 and 6. The sectors 25 are designed to be positioned in alignment with selected sectors 17ª of the base 10, the radial lines defining the sectors 17ª and 25 being adapted for radial alignment to facilitate such positioning.

Adjacent the side thereof, opposite the sectors 25, the disc 13 is provided with a plurality of arcuately arranged openings 30 for a purpose to be described. Intermediate the openings 30 are disposed radial lines 31, each of said lines having suitable identifying indicia indicating varying degrees of density of the negative. Thus the intermediate line has the marking OO denoting what may be termed a medium or average density. Lines to the left of this intermediate line have markings denoting progressively thinner density while lines to the right have markings denoting progressively increasing density. As will be apparent hereinafter the lines 31 are designed to cooperate with a suitable marking on the disc 14 to indicate varying degrees of density for which the device may be set.

The disc 14 is releasably secured to the disc 13 for rotation therewith during operation of the device. For this purpose the disc 14, which, as previously pointed out, is approximately the same size as the discs 12 and 15, is provided with a radially extending tab 33, which projects outwardly beyond the peripheral edge of the disc 15, and has spaced openings 34 therein adapted to be aligned with any adjacent pair of openings 30 of the disc 13. When the openings 30 and 34 are so aligned, the discs 13 and 14 may be releasably secured together with a U-shaped metal clip 35 merely by inserting the legs thereof through the aligned openings 30 and 34 and turning the ends thereof inwardly in clinching relation under the disc 13 as clearly shown in Figure 3.

At one side of the left opening 34, as viewed in Figure 1, the tab 33 is provided with a suitable marking, for example, the arrow 36, so positioned on the tab as to be aligned with one of the lines 31 when the openings 34 are in registration with any adjacent pair of openings 30.

The disc 14 is further provided with indicia made up of concentric rows of numerals arranged in such a way that a series of radially extending tables 37 is formed, these tables indicating exposure times for particular stop values. The tables 37 are selectively positionable beneath the opening 24 of the top disc 15, the particular table positioned therebelow depending on the relative adjusted positions of the discs 14 and 15.

As previously pointed out, the indicia bearing discs are rotatably mounted on a headed stud 11, carried by the base 10, and provided with an annular groove 18 adjacent its upper end. The annular groove 18 is so positioned on the stud that the lower side wall thereof is substantially flush with, or slightly above, the upper surface of the top indicia bearing disc 15. The groove 18 is designed to cooperate with a film arm 40 for releasably securing the indicia bearing discs in assembled relation with the base 10.

The film arm 40 consists of an elongated strip of thin sheet material, for example, a plastic material preferably colored so as to be partially opaque and having an elongated opening or transparent window 41 therein designed to register with the radially disposed indicia on the disc 15 which denotes the hours of the day.

The width of the opening 41 is slightly greater than the diameter of the stud 11 so that it may be slipped thereover for a purpose hereinafter described. Communicating with the opening 41 at one end thereof is a slot 42 extending longitudinally toward the end of the film arm and of a width somewhat less than the diameter of the stud 11 but slightly greater than the diameter of the reduced neck of the stud 11 formed by the annular groove 18.

At the end thereof opposite the slot 42 the strip 40 is provided with longitudinally spaced openings 43 adapted to receive a metal clip 44 having legs 45 adapted to be extended through a selected opening 16 of the base 10 and then bent outwardly thereagainst to secure the strip in fixed position.

To facilitate rotation of the discs 13 and 14 without interference with the disc 15 an elongated arm 46, preferably formed of suitable sheet material, for example, plastic, is mounted on the stud 11 intermediate the discs 14 and 15. The arm 46 may be shaped similarly to the film strip 40 and is provided with an opening 47 adjacent the outer end thereof through which the legs of the clip 44 may be passed to secure it in fixed position. It will be apparent that the arm 46 decreases the friction between the discs 14 and 15 so that rotation of the one may be effected with substantially decreased tendency to rotate the other. The arm 46 further serves to increase the friction between the disc 15 and the film arm thereby assisting in maintaining the disc 15 in any of its set positions.

*Operation*

In assembling the device the indicia bearing discs 12, 13, 14 and 15 and arm 46 are placed on the stud 11 in the proper order and then secured in position thereon by the film arm 40. Mounting of the film arm 40 is very simply accomplished by positioning it with the opening 41 over the stud 11, moving the arm downwardly until the confining edges of the slot 42 are positioned in horizontal alignment with the groove 18 and then moving it outwardly to engage said edges in the groove 18. The assembly may then be completed by passing the legs 45 of the clip 44 through the opening 47 of the arm 46, thence through a desired opening 16 in the base 10, and then bending the ends of the legs 45 outwardly against the base.

When thus assembled the disc 12 which is not in use, is disposed between the base 10 and the lower disc 13 and does not interfere in any way with the functioning of the device. When it is desired to use the disc 12, as for example, in taking pictures in localities south of the equator, the device is very simply disassembled by removing the film arm and the discs in a manner the reverse of that described above, and then reassembling the parts with the positions of the discs 12 and 15 reversed.

To illustrate the operation of the device let us assume that the disc 14 is secured to the disc 13 in a position such that the arrow 36 on the tab 33 is aligned with the radial line 31 of the disc 13 which is denoted by the indicia OO. Such setting of the disc 14 with respect to the disc 13 is designed to provide a negative of medium but uniform density. Let us further assume that it is desired to find the correct shutter speed and lens opening for a street view, after 8 a. m., on a dull day in the month of June, using a film having a Weston rating of 50.

The film arm 40 is set and secured at the opening 16 in the base 10 having the designating indicia 50, which is the film rating of the film being used. The disc 13 is now turned until the designation "Street V" thereon coincides with the designation "Dull" on the base 10.

The concentric sector 20 of the disc 15 in which the month of June appears is found, and the hour 8 a. m. is brought under the opening or window 41 of the film arm 40. The table 37 for eight correct shutter speeds will then appear at the window or opening 24 of the disc 15 and with the opposite lens opening on disc 15 will give eight exposure combinations of equal light value which range from 4 seconds at f/32 to 1/60 second at f/2.8, any one of which will be a correct exposure. The photographer may choose the exposure combination which best suits his equipment.

If the conditions are properly interpreted and the calculator carefully set the exposure time indicated should give a negative of medium density. However, if the negative is found to be too thin or too dense, due to one or more of the causes, hereinbefore noted, for example, a defective shutter, the clip 35 is removed and the disc 14 adjusted to the right or left, as the case may be, to align the arrow 36 with another line 31. The clip 35 is then replaced to hold the disc 14 in its new adjusted position with respect to the disc 13. As illustrated, if a greater degree of density of the negative is desired, the disc 14 is rotated in a counterclockwise direction as shown in Figure 1. If a thinner density of the negative is sought, the disc 14 is moved in the opposite direction.

If, after the adjustment, the negative is still too dense or too thin additional adjustments are then made until the desired degree of density is obtained. The calculator is thus set to provide negatives of the desired degree of density and subsequent exposures will be of a uniform desired density.

It will thus be seen that the present invention provides a photographic exposure calculator of improved construction and operation which embodies a density control device that may be set to obtain varying degrees of density of the negative. Such device may be set to automatically correct for various density modifying factors thereby eliminating the necessity for the photographer to make mental calculations and camera adjustments every time an exposure is made. The device of the invention further includes, as a part thereof, an alternate disc for use north or south of the equator, as the case may be, and is constructed and arranged for rapid and easy assembly and disassembly to exchange the alternate discs or to replace or repair the discs.

While I have illustrated and described a preferred form of the invention it will be apparent that various changes may be made without departing from the scope of the invention. For example, while I have described the film arm 40 as having an opening 41 it will be apparent that the same effect may be obtained by eliminating such opening and making that portion of the arm transparent. In such event, it would, of course, be necessary to enlarge the inner portion of the slot 42 to an extent such that it would receive the stud 11. Such enlargement would desirably be circular and slightly larger in diameter than the stud 11.

Further changes which may occur to those skilled in the art are considered within the scope of the invention as defined in the following claims.

I claim:

1. A photographic exposure calculator comprising a base having a series of indicia thereon designating different light conditions, a plurality of discs rotatably mounted on said base in superposed relation and including an upper disc having season denoting indicia, a lower disc and an intermediate disc, said lower disc having a series of subject denoting indicia thereon for cooperation with the indicia on said base, said intermediate disc being smaller in diameter than said lower disc and being selectively movable to different operative positions thereon, said intermediate disc having a plurality of tables of shutter speeds on its upper face and further having film density correction factor indicia thereon positionable in predetermined relationship to cooperating indicia on said lower disc when the former is moved to its different operative positions, means for releasably connecting said intermediate disc to said lower disc in a selected operating position for rotation therewith, a normally stationary member mounted on said base outwardly of said upper disc and including means adapted to cooperate with season denoting indicia on said upper disc, said normally stationary member being selectively movable to different operative positions on said base in accordance with the characteristics of the film to be used, and means for retaining said normally stationary member in a selected operating position, said upper disc having a window for exposing one of the table of shutter speeds on the intermediate disc.

2. A device of the type set forth in claim 1 wherein said normally stationary member comprises an arm having a window therein for exposing a portion of the season denoting indicia on said upper disc.

3. A device of the type set forth in claim 2 wherein said arm is mounted concentrically with said discs for swinging movement to different operative positions.

4. A photographic exposure calculator comprising a base having a series of indicia thereon designating different light conditions, a plurality of discs rotatably mounted on said base in superposed relation and including upper and lower discs and an intermediate disc, said lower disc having a series of subject denoting indicia thereon for cooperation with the indicia on said base, said intermediate disc being smaller in diameter than said lower disc and being selectively movable to different operative positions thereon, said intermediate disc further having a plurality of tables of shutter speeds and film density correction factor indicia thereon the latter of which is positionable in predetermined relationship to cooperating indicia on said lower disc when said intermediate disc is moved to its different operative positions, means for releasably connecting said intermediate disc to said lower disc in a selected operating position for rotation therewith, said upper disc being formed to expose to view one of the table of shutter speeds on said intermediate disc, a normally stationary member mounted on said base outwardly of said upper disc and swingable to different operative positions thereon in accordance with the characteristics of the film to be used, and means for retaining said normally stationary member in a selected operating position, said upper disc having season denoting indicia thereon positionable in predetermined relation with said normally stationary member when the disc is rotated.

5. A calculator as set out in claim 4, a stud mounted in the base and projecting outwardly from the upper face thereof to serve as the axis for rotation of the discs, said stud having an annular groove adjacent its outer end, the discs being mounted on said stud between the groove and said base, an elongated arm mounted on said base outwardly of said discs and having its inner end detachably engaged with said stud, said arm being releasable from engagement with said stud by longitudinal movement with respect to said stud and means connecting the outer end of said arm with said base, outwardly of said discs to prevent longitudinal movement thereof and disengagement from said stud, said elongated arm constituting the normally stationary member and said outward connecting means constituting the means for retaining the normally stationary means in operating position.

References Cited in the file of this patent

UNITED STATES PATENTS

| | | |
|---|---|---|
| 1,074,347 | Black | Sept. 30, 1913 |
| 1,207,448 | Venable | Dec. 5, 1916 |
| 1,262,635 | Cady | Apr. 16, 1918 |
| 1,495,805 | Rooney | May 27, 1924 |
| 2,244,514 | Gwiekalo | June 3, 1941 |
| 2,373,671 | Feicht | Apr. 17, 1945 |
| 2,533,580 | Hall | Dec. 12, 1950 |